(12) United States Patent
Orcutt

(10) Patent No.: US 10,091,651 B2
(45) Date of Patent: Oct. 2, 2018

(54) REMOTE AUTHENTICATION THROUGH RECONFIGURABLE BOSON SAMPLERS

(71) Applicant: International Business Machines Corporation, Armonk, NY (US)

(72) Inventor: Jason S. Orcutt, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 14/961,680

(22) Filed: Dec. 7, 2015

(65) Prior Publication Data
US 2017/0164191 A1   Jun. 8, 2017

(51) Int. Cl.
*H04L 9/32* (2006.01)
*H04W 12/06* (2009.01)
*H04B 10/70* (2013.01)
*H04B 10/07* (2013.01)

(52) U.S. Cl.
CPC ........ *H04W 12/06* (2013.01); *H04B 10/0705* (2013.01); *H04B 10/70* (2013.01); *H04L 9/3278* (2013.01)

(58) Field of Classification Search
CPC ... H04B 10/70; H04B 10/0705; H04L 9/3278; H04W 12/06; G02B 1/005; G02B 5/008; G02B 5/1809; G02B 6/1226; G01N 21/553

See application file for complete search history.

(56) References Cited

U.S. PATENT DOCUMENTS

| 6,728,281 | B1 | 4/2004 | Santori et al. |
| 7,451,292 | B2 | 11/2008 | Routt |
| 2010/0027794 | A1* | 2/2010 | Yuan .................. H04B 10/70 380/255 |

(Continued)

OTHER PUBLICATIONS

A. P. Lund, A. Laing, S. Rahimi-Keshari, T. Rudolph, J. L. O'Brien, and T. C. Ralph, Boson Sampling from a Gaussian State, Sep. 5, 2014, PRL 113, 100502 (2014).*

(Continued)

*Primary Examiner* — Shewaye Gelagay
*Assistant Examiner* — Amie C Lin
(74) *Attorney, Agent, or Firm* — Vazken Alexanian; Michael J. Chang, LLC

(57) ABSTRACT

Techniques for remote authentication using reconfigurable boson samplers are provided. In one aspect, a method for remote authentication includes the steps of: providing an input photon configuration for an optical transmission network; receiving a response including measured output quantum photon coincidence frequencies from the optical transmission network based on the input photon configuration; comparing the measured output quantum photon coincidence frequencies to output quantum photon coincidence probabilities calculated for the optical transmission network; and verifying the response if the measured output quantum photon coincidence frequencies matches the output quantum photon coincidence probabilities calculated for the optical transmission network with less than a predetermined level of error, otherwise un-verifying the response. A verification system including an optical transmission network is also provided.

13 Claims, 4 Drawing Sheets

Remote authentication by use of a physical unclonable function (PUF)

(56) References Cited

U.S. PATENT DOCUMENTS

| | | | | |
|---|---|---|---|---|
| 2010/0265077 A1* | 10/2010 | Humble | ............... | G08B 13/124 340/600 |
| 2011/0055585 A1 | 3/2011 | Lee | | |
| 2014/0016947 A1* | 1/2014 | Leven | ................... | H04L 27/233 398/208 |
| 2014/0191115 A1 | 7/2014 | Webster et al. | | |
| 2015/0323386 A1* | 11/2015 | Hoeffner | ............... | G01N 21/538 356/451 |
| 2016/0112192 A1* | 4/2016 | Earl | ..................... | H04L 9/0858 380/44 |

OTHER PUBLICATIONS

Gard et al., "An introduction to boson-sampling," Quantum Physics arXiv:1406.6767 Jun. 2014 (13 pages).

J.B. Spring et al., "Boson Sampling on a Photonic Chip," Science, vol. 339, No. 6121, pp. 798-801 (Feb. 2013).

Branning et al., "An FPGA-based module for multiphoton coincidence counting," Proc. SPIE 8375, Advanced Photon Counting Techniques VI, 83750F (May 2012).

Bentivegna et al. "Experimental scattershot boson sampling," Science Advances 1.3 (Apr. 2015): e1400255 (21 pages).

Brod, "The complexity of simulating constant-depth BosonSampling," arXiv preprint arXiv:1412.6788, pp. 1-9 (Dec. 2014).

Yoon et al. "Quantum signature scheme based on a quantum search algorithm," Physica Scripta 90.1 (Jan. 2015): Abstract (1 page).

Shor, "Polynomial-Time Algorithms for Prime Factorization and Discrete Logarithms on a Quantum Computer," arXiv:quant-ph/9508027v2, pp. 1-28, Jan. 25, 1996.

Olson et al. "Sampling arbitrary photon-added or photon-subtracted squeezed states is in the same complexity class as boson sampling," arXiv preprint arXiv:1406.7821 (Feb. 2015).

Bennett et al. "Experimental quantum cryptography," Journal of cryptology 5.1 (1992): 3-28.

* cited by examiner

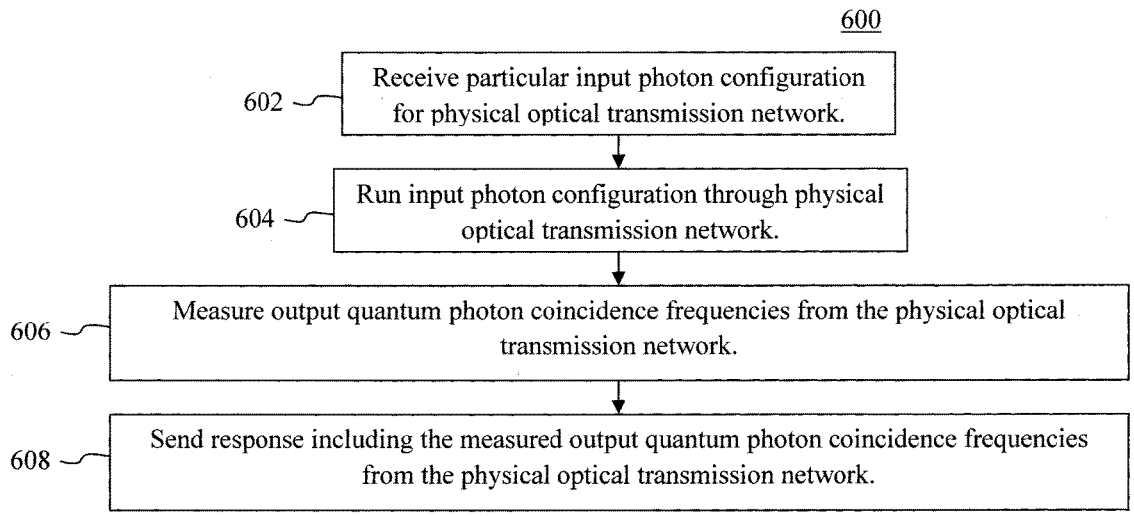
FIG. 6
FIG. 7
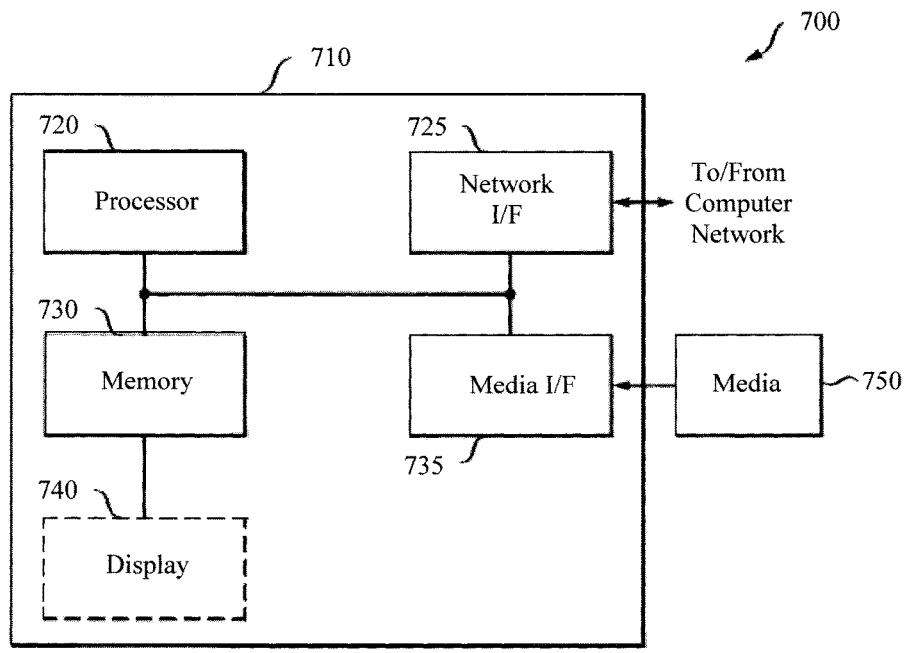

REMOTE AUTHENTICATION THROUGH RECONFIGURABLE BOSON SAMPLERS

FIELD OF THE INVENTION

The present invention relates to remote authentication, and more particularly, to techniques for remote authentication using reconfigurable boson samplers.

BACKGROUND OF THE INVENTION

Remote authentication protocols traditionally involve the use of secret information (such as a private key) to authenticate a user. The crux of these types of authentication scenarios is that the private key must be kept secret. If the key is compromised, unauthorized access can occur.

Physical unclonable functions (PUFs) are devices embodied in a physical structure (such as an integrated circuit) which, based on random physical factors, makes them for all intents and purposes impossible to duplicate or clone. PUFs for remote authentication have been proposed previously. However, no existing physical system has been shown to be fully suitable for real authentication applications.

Systems of boson sampling and reconfigurable boson sampling have been experimentally demonstrated for physics and computational applications. See, for example, Gard et al., "An introduction to boson-sampling," Quantum Physics arXiv:1406.6767 (13 pages). A boson sampling device is a photonic device that, via a beam splitter, converts one set of photons arriving at an input port(s) of the device into a second set of photons leaving the device by an output port(s). The probability of an input leading to a certain output of the device is then determined.

Techniques for implementing boson sampling for producing PUFs that are suitable for real authentication applications, such as remote authentication, would be desirable.

SUMMARY OF THE INVENTION

The present invention provides techniques for remote authentication using reconfigurable boson samplers. In one aspect of the invention, a method for remote authentication is provided. The method includes the steps of: providing an input photon configuration for an optical transmission network; receiving a response including measured output quantum photon coincidence frequencies from the optical transmission network based on the input photon configuration; comparing the measured output quantum photon coincidence frequencies to output quantum photon coincidence probabilities calculated for the optical transmission network; and verifying the response if the measured output quantum photon coincidence frequencies matches the output quantum photon coincidence probabilities calculated for the optical transmission network with less than a predetermined level of error, otherwise un-verifying the response. Since the response can be calculated for verification, the experimental data must be distinguished from a computational attack by the time elapsed in the challenge/response protocol. This can be ensured by the #P-complete theoretical bound for the minimum computational effort for predicting the measurement results. The verification algorithm therefore has a maximum response latency, otherwise un-verifying the response.

In another aspect of the invention, a verification system is provided. The verification system includes: providing a photon source; an optical transmission network; one or more input switches on an input side of the optical transmission network, wherein the input switches are configured to provide an input photon configuration to the optical transmission network; and an array of photo-detectors on an output side of the optical transmission network, wherein the array of photo-detectors is capable of resolving single photons, and wherein the array of photo-detectors is configured to measure output quantum photon coincidence frequencies from the optical transmission network.

A more complete understanding of the present invention, as well as further features and advantages of the present invention, will be obtained by reference to the following detailed description and drawings.

BRIEF DESCRIPTION OF THE DRAWINGS

FIG. 6 is a diagram illustrating an exemplary methodology for remote authentication (from a remote authority perspective) according to an embodiment of the present invention; and FIG. 7 is a diagram of an exemplary apparatus for implementing one or more of the methodologies presented herein according to an embodiment of the present invention.

DETAILED DESCRIPTION OF PREFERRED EMBODIMENTS

Provided herein are techniques for use of a boson sampler as a physically unclonable function (PUF). More specifically, remote authentication (i.e., the verification of possession of a unique object) is established by a challenge/respond/verify protocol utilizing a physical experiment. A physical system of a boson sampler of appropriate input photon number and output mode count with reconfigurable input ports is proposed herein as a system that meets all of the requirements for remote authentication. A verification algorithm that requires significantly reduced computation power as compared to a blind attack is provided herein for the remote authentication problem.

Figure 1:
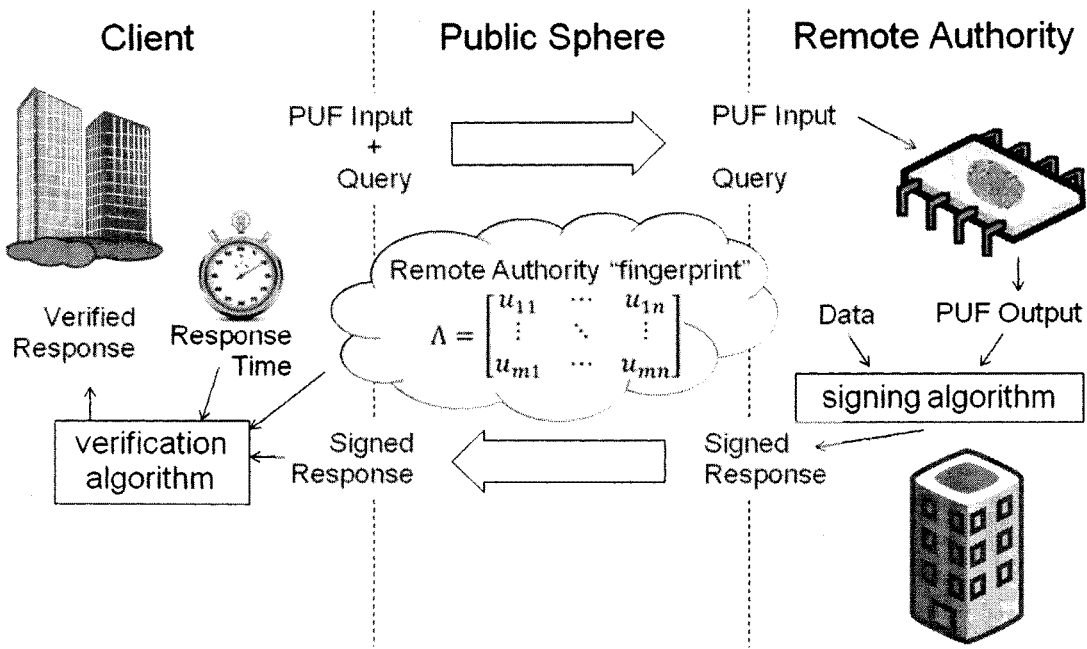
FIG. 1 is a diagram illustrating the present techniques for remote authentication using a boson sampler as a physically unclonable function (PUF) according to an embodiment of the present invention.

An overview of the present techniques for remote authentication by use of a boson sampling-based PUF is provided by way of reference to FIG. 1. In the example shown in FIG. 1, the present techniques will enable a client (e.g., a user) to remotely (e.g., via the Internet) verify that a (remote) authority (e.g., an institution in possession of personal information—such as a financial institution, the government, etc.) is in possession of the physical authentication PUF device (e.g., an optical transmission network) by verification of the measured output quantum photon coincidence frequencies of a particular input photon configuration (i.e., via boson sampling).

Namely, as shown in FIG. 1, a client sends a query to the remote authority via a public sphere (such as the Internet). The query is sent along with the input photon configuration for the PUF (labeled "PUF input"). Upon receipt of the query/PUF input, the remote authority queries the PUF (of which only a valid authority would be in possession). The remote authority then returns a response to the client (e.g., again via the public sphere), the response containing the output from the PUF (labeled "PUF output") and any data requested by the client. As shown in FIG. 1, the remote authority can use a signing algorithm to generate a signed response to the client.

The purpose of the signing algorithm is to ensure that the PUF output and the data requested by the client are incontrovertibly linked during network transmission. If a third party, e.g., a "man-in-the-middle," was able to separate the PUF output from the returned data and reconstruct the response with false data, the security of the transaction would be compromised. To prevent this, many classical cryptography signing algorithms can be utilized. In the simplest implementation, the PUF output and response data can be hashed together. A man-in-the-middle would then have to unhash and rehash the message to alter the content while preserving the PUF output. The minimum time associated with the computational effort for such an attack can be ensured to be greater than the allowable response latency to ensure security. Alternatively, if the requesting party identity is known, standard public key/private key cryptography can ensure that only the intended recipient can read the response by encrypting against the recipient's public key.

Upon receipt of the signed response, the client then verifies the PUF output. By verification it is taken to mean that the client compares the PUF output from the remote authority to the output of the PUF known to the client, and they match within an acceptable level of error. For instance, the client verifies that the received output quantum photon coincidence frequencies match the input photon configuration (sent by the client to the remote authority), and that any error in the output is less than a pre-defined tolerance.

As highlighted above, the output from the remote authority is based on the transformation $\Lambda$ of the input via a boson sampler PUF (a classical transmission matrix made up of M×M complex numbers). The output is used to uniquely identify/authenticate the remote authority similar to use of a fingerprint to identify a person. Thus, the output from the remote authority is also referred to herein as a "Remote Authority Fingerprint."

A verification algorithm can be used by the client to analyze the remote authority fingerprint based on the PUF output known to the client. As shown in FIG. 1, the verification process preferably takes into account the response time, i.e., the time difference between when the PUF input was sent by the client and when the signed response was received back from the remote authority. This aspect of response time is important to rule out the possibility of attacks by unauthorized parties by independently calculating the output. For instance, security is obtained by the uniqueness of the PUF to calculate verifiable output to a large number of possible inputs faster than any other computer/device in existence. Thus, when the correct response is received within a predetermined response time (which is set to be shorter than the time needed by the current technology to calculate the output), then the client can safely assume that the response was sent by the remote authority.

The maximum allowable response time can be set by both network and sampling device considerations. Depending on the length scale, public internet latencies can range from 10 milliseconds (ms) to 500 ms for most locations. Considerations for a specific link can allow for a tighter latency bound. For the sampling experiment latency, the configuration setup and sampling details must be considered. The configuration setup can be bounded to be less than 1 microsecond for electro-optic switches and therefore neglected. The sampling rate of approximately 100 MHz then needs to be compared against the size and fraction of the output probability space. For the example of 100 million possible outputs, of which 1% of the output space needs to be sampled on average of 100 times for sufficiently accurate experimental estimation of the theoretical probability, the total sampling time can be set to be 1 second (s). Therefore, the maximum allowable response time for the protocol can be set to be 1.5 seconds for world-spanning internet traffic with this set of underlying technology and network parameters.

As highlighted above, the present techniques employ a boson sampler as a PUF. Boson samplers are described, for example, in J. B. Spring et al., "Boson Sampling on a Photonic Chip," Science, vol. 339, no. 6121, pp. 798-801 (February 2013) (hereinafter "Spring"), the contents of which are incorporated by reference as if fully set forth herein. Referring to FIG. 1 of Spring, the input to the boson sampling machine (PUF) is a particular combination of photons $|T\rangle$, e.g., $|12012 \ldots 1\rangle$. In accordance with the present techniques, the transformation $\Lambda$ is the PUF fingerprint (classical transmission matrix made up of M×M complex numbers). The PUF outputs are the frequencies of correlated photon outputs $|S\rangle$, e.g., $|13020 \ldots 4\rangle$ for 2% of trials. This means that if the output photon coincidence experiment is repeated N times for input $|T\rangle (|12012 \ldots 1\rangle)$, 0.02*N times the output coincidence $|S\rangle (|13020 \ldots 4\rangle)$ will be measured. This is the experimental approximation that $P(S|T)=0.02$. Based on the scenario presented in FIG. 1, the client challenges with $|T\rangle$, and the remote authority replies with P $(S|T)$. See FIG. 1 of Spring.

Figure 2:
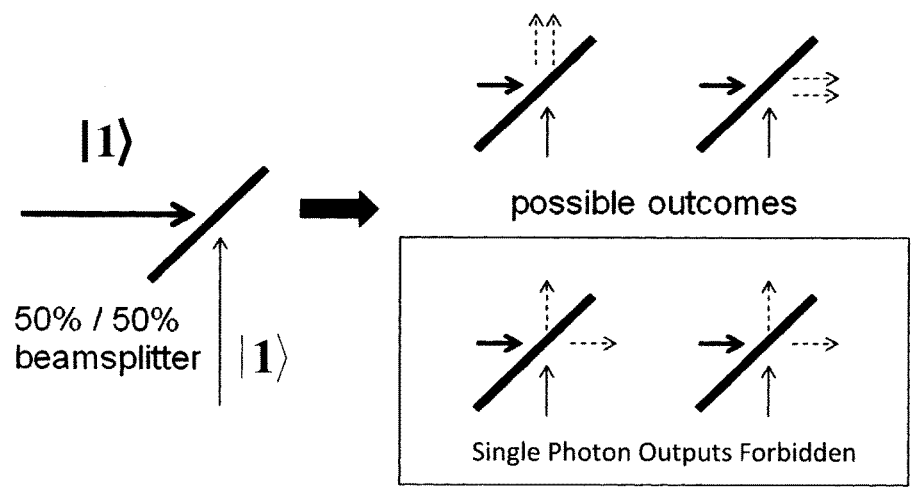
FIG. 2 is a diagram illustrating quantum interference of single photon states in the present boson sampler PUF according to an embodiment of the present invention.

As provided above, a boson sampler uses a beam splitter to convert one set of photons arriving at an input port(s) of the device into a second set of photons leaving the device by an output port(s). The sampler then determines the probability of an input leading to a certain output of the device. A boson sampler works on the basic principle of quantum interference of single photon states. See, for example, FIG. 2. As shown in FIG. 2, there are two possible scenarios for the incoming photons when path interference is provided by a 50%/50% beam splitter. Namely, due to interference (path entanglement) movement of the photons will become correlated and both photons will either be deflected to the left or both to the right (see FIG. 2 "possible outcomes"). As also shown in FIG. 2, single photon outputs do not occur. Thus, with two incoming photons to the boson sampler there are only two possible outcomes.

As provided above, an important component of the present verification process is that the correct response from the remote authority is received within a predetermined amount of time (a predetermined response time) which is set to be shorter than one could theoretically compute the answer. Namely, by way of reference to the example provided in FIG. 1, the client sends a PUF input to the remote authority. The remote authority provides that input to their boson sampler PUF, measures the respective output from the boson sample, and sends the (answer) output to the client. In order for the answer to be verified, the time between when the client sends the input and when the client receives the answer from the remote authority must be faster than the answer can be independently calculated using any computer currently in existence. Due to the nature of a boson sampler, this is a realistic time frame. For instance, take for example a boson sampler system with n photons and m modes:

$$P(S|T) \propto |\text{Per}(\Lambda^{(S,T)})|^2$$

Figure 3:
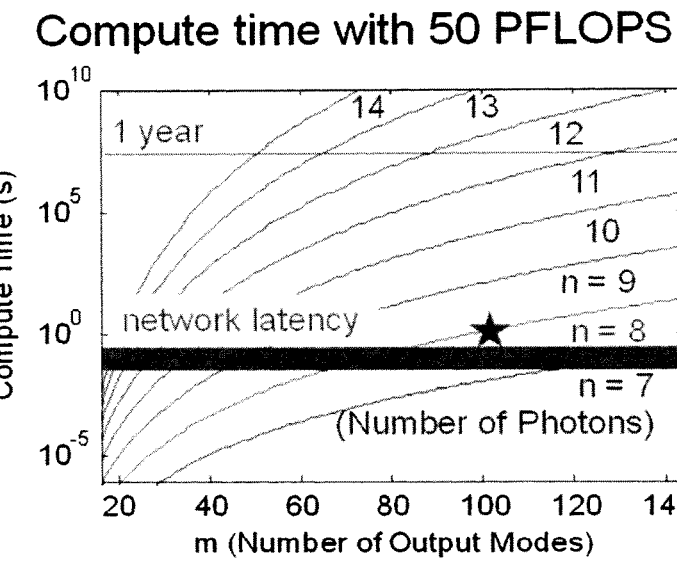
FIG. 3 is a diagram illustrating compute time for a boson sampler PUF with 50 P floating-point operations per second (PFLOPS) according to an embodiment of the present invention.

P(S|T) represents $$\binom{m}{n}$$

combinations and $\text{Per}(\Lambda^{(S,T)})$ represents n·n! floating point operations. Thus, the number of floating point operations scales exponentially with the system size. See, for example, FIG. 3. FIG. 3 is a diagram comparing compute time (measured in seconds (s)) with the number of output modes (m) and number of photons (n). As shown in FIG. 3, with approximately 100 output modes (m) and 8 photons (n), the compute time is commensurate with the network latency (i.e., the time it takes for data packets to go from the client to the remote authority, and back).

Figure 4:
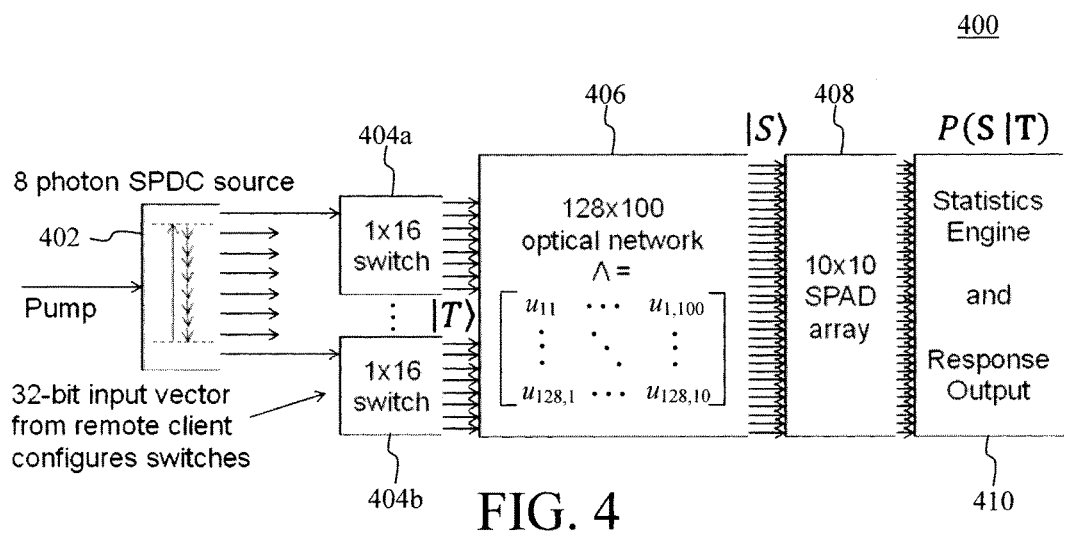
FIG. 4 is a diagram illustrating an exemplary configuration of the present boson sampler system PUF according to an embodiment of the present invention.

An exemplary configuration of the present boson sampler-based PUF system is shown in FIG. 4. As will be described in detail below, the present techniques generally involve verifying that a party (such as a remote authority—see FIG. 1) is in physical possession of a boson sampler-based PUF system, such as system 400 of FIG. 4. Thus, in the scenario depicted in FIG. 1, each valid remote authority would be in possession of a system 400. The verification process generally involves providing a particular input photon configuration to system 400 and, e.g., at the client side, determining whether the output is what is expected from system 400 (based on a calculated probability—see below).

As shown in FIG. 4, in this example the system 400 includes an 8 photon spontaneous parametric down-conversion (SPDC) source 402, switches 404 for switching the (input) photons from the SPDC source 402 to input ports of (i.e., a boson sampler) physical optical transmission network 406, an array of photo-detectors 408 on the output side of the physical optical transmission network 406 capable of resolving single photons, and a statistics engine and response output module 410 for determining the n-most frequent output coincidences from the array and their rate, and for sending a signed response to the client.

A conventional SPDC source uses a nonlinear crystal to split photons. When the photon source is a laser, the beam from the laser (also commonly referred to as the "pump" beam—see FIG. 4) is directed at the crystal. Some of the photons will undergo spontaneous down-conversion. The goal is to produce (in this case 8) single photons as input to the physical optical transmission network 406. Besides lasers, any SPDC source may be employed to generate the single photons. By way of example only, the single photon source may be a quantum dot device. See, for example, U.S. Pat. No. 6,728,281 issued to Santori et al., entitled "Quantum-Dot Photon Turnstile Device" (hereinafter "U.S. Pat. No. 6,728,281"), the contents of which are incorporated by reference as if fully set forth herein. As provided in U.S. Pat. No. 6,728,281, pairs of electrons and holes are alternately injected into a single quantum dot where they combine to form photons.

Switches 404 switch to which of the ports of the physical optical transmission network 406 the single input photons from the SPDC source are directed. As described above, the present verification procedure involves the client providing a PUF input. That input can be instantiated in system 400 via switches 404. Namely, in the example provided in FIG. 4 there are 2 optical switches 404a and 404b. As is known in the art, an optical switch provides channel selection between a single input optical fiber and N output optical fibers. In this example N=16. The PUF input from the client can be presented as an input vector which is then used to configure the switches 404. Thus, the SPDC source 402 and switches 404 will provide the specific input (specified by the client) to the physical optical transmission network 406. For a valid response, the output must be verified with the client.

Any suitable type of photo-detector capable of resolving single photons may be used in the present systems. By way of example only, a single-photon avalanche diode (SPAD) detector may be employed. SPAD photo-detectors are described, for example, in U.S. Patent Application Publication Number 2014/0191115 by Webster et al., entitled "SPAD Sensor Circuit with Biasing Circuit," the contents of which are incorporated by reference as if fully set forth herein.

A suitable apparatus for the statistics engine and response output module 410 is described, for example, in conjunction with the description of FIG. 7, below. The statistics engine and response output module 410 takes the output from the physical optical transmission network 406 and reports back the n-most frequent coincidences and their rate to the client. Module 410 may include a photon coincidence counter. Coincidence counting involves simultaneous detection of two or more photons at different photo-detectors in the SPAD array. See, for example, Branning et al., "An FPGA-based module for multiphoton coincidence counting," Proc. SPIE 8375, Advanced Photon Counting Techniques VI, 83750F (May 2012), the contents of which are incorporated by reference as if fully set forth herein. Module 410 may count all observed coincidences for a given input photon configuration. To reduce the quantity of data, module 410 may sort the observed coincidence combinations by number of observed coincidence counts, divide each combination count by the total number of coincidences to obtain coincidence rates, and report the n-most frequently observed rates for verification.

Based on the PUF input from the client (i.e., a vector T), the SPDC source 402 will generate (in this case 8) single photons and the physical optical transmission network 406 will create and observe the output (i.e., a set S given the input T). System 400 cannot control how the output is made—i.e., it simply takes the input and generates the respective output. The n-most frequent output photon coincidences and their frequency are reported back to the client for verification.

Each combination of input photons to the physical optical transmission network 406 creates a new set of matrices for all output photon combinations. See, for example, Spring FIG. 3A (which shows boson sampling results for a three-photon experiment). As shown in FIG. 3A of Spring, the (input) switches 404 will give sufficient complexity to generate a new set of matrices for permanent calculations, wherein the input photon states determine the rows, the output photon states determine the columns, and the multi-photon outputs duplicate rows/columns. Matrix permanents cannot be estimated below factorial time.

As described in conjunction with the description of FIG. 1 above, the present techniques can be employed to verify that a party (such as a remote authority) is in possession of the physical optical transmission network 406. To do so, verification is made (e.g., by the client) of the measured output quantum photon coincidence frequencies of a particular input photon configuration (e.g., sent by the client). The verification process involves comparing the calculation for the output quantum photon coincidence probability utilizing the public classical optical transmission properties of the specified network with respect to the returned measured frequencies and testing that the error is less than a predefined tolerance.

For instance, according to an exemplary embodiment the specific characteristics of the boson sampler-based PUF system (e.g., system 400) are made public, such as the particular SPDC source (e.g., SPDC source 402), input switches (e.g., switches 404), physical optical transmission network (e.g., physical optical transmission network 406), photo-detectors (e.g., photo-detectors 408), etc. By "made public" it is meant that the configuration is known ahead of time by at least the client and the remote authority. What is not made public is the particular input photon configuration, which is sent by the client to the remote authority only at the time of verification. Instead, the sampler system provides a very large input space of possible input photon configurations. The particular input photon configuration for each transaction can then be randomly generated by the client. If desired, the sampler can keep a list of previously used inputs to prevent attack by past users or network snoopers. The sampler can then request a new input if the random number collides with previously used combinations within the large state space. Thus, the remote authority only has the opportunity to take that particular input photon configuration and produce a measured output which must be returned to the client within a pre-determined response time.

As provided above, the present process is employed to verify whether or not a party (such as a remote authority) is in physical possession of the boson sampler-based PUF system. Thus, in order to be validated, the remote authority must be in possession of the PUF system. The client merely needs to generate a random bit string as the input challenge and can computationally verify the returned response using only publically available data and the observed time elapsed during response.

Figure 5:
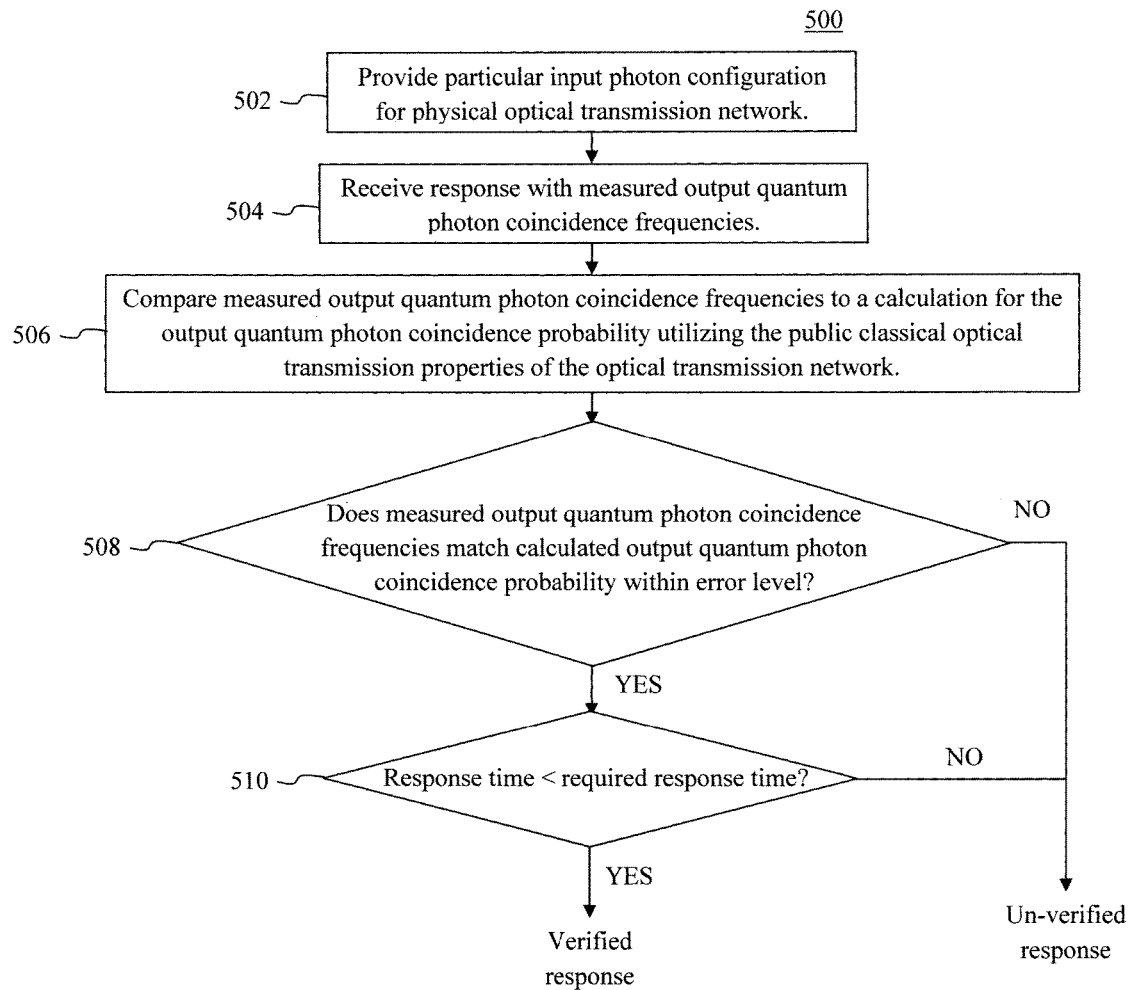
FIG. 5 is a diagram illustrating an exemplary methodology for remote authentication (from a client perspective) according to an embodiment of the present invention.

Given the above description, an exemplary embodiment of the present techniques is now provided by way of reference to FIG. 5 which provides a methodology 500 for remote authentication. As provided above, the goal is to verify that a party (e.g., a remote authority) is in possession of a physical optical transmission network. Without being in possession of the physical optical transmission network, the remote authority cannot provide a verifiable response within a required response time—see below.

The verification process involves, in step 502, providing a particular input photon configuration (i.e., a particular combination of photons) to the remote authority. In the example shown in FIG. 1, the particular input photon configuration (PUF input) is sent by the client to the remote authority. Accordingly, methodology 500 can represent the steps performed by the client during the present authentication process.

Assuming the remote authority is in possession of the correct physical optical transmission network through which the input photon configuration can be run and the output measured (see description of FIG. 4—above), in step 504 a response will be received by the client (from the remote authority) containing the measured output quantum photon coincidence frequencies. As provided above, the output from the present physical optical transmission network are the frequencies of correlated photon outputs and, according to an exemplary embodiment, the response includes the n-most frequent output photon coincidences and their frequency.

In order to verify the response, in step 506 the client will compare the measured output quantum photon coincidence frequencies in the response to a calculation for the output quantum photon coincidence probability utilizing the public classical optical transmission properties of the specified network. Namely, the optical transmission properties of the physical optical transmission network (see FIG. 4—described above) can be used to calculate the output for a given input photon configuration. While the computational resources needed to calculate all possible permutations of output photon states to find the most probable output (such as in the case of a blind attack) would not be possible within the designated response time (see below) even with the most advanced machines in existence today, it is possible to calculate the full output characteristics of a given input photon state. However, this computation must be burdensome as compared to the size of the input space such that a blind attacker can't build up a sufficient database of outputs for a meaningful fraction of the input probability space. Practically, this means that the brute-force verification time for a given input photon combination must be on the order of 100,000 times the duration of the maximum transaction latency to distinguish experiment from computational attack with the most advanced computational resources available in the world. This verification computation is burdensome, but the experimental details of a sampling system can decouple the computational burden of verification from blind attack. While the attacker must consider all possible output combinations to find the most likely outputs, the client is provided with the (e.g., n-most) frequent output with the experimental/measurement data contained in the response. The client must verify two facts. First, that the returned probabilities match the theoretical predictions within the bounds of computational error. Second, that the total cumulative probability (sum of all returned n-most combinations) is consistent with the sampling experiment as opposed to arbitrary, or even well-informed heuristically chosen, output photon combinations associated with a blind computational attack. Therefore, given this data, the computation of the output quantum photon coincidence probability on the client end is made practical.

In step 508, a determination is made as to whether the measured output quantum photon coincidence frequencies match the calculated output quantum photon coincidence probabilities with less than a predetermined level of error. The predetermined level of error is set by the stability and accuracy tolerances of the boson sampler PUF token fabrication. This is a combination of photon source heralding efficiency, optical network loss, optical network stability and photon detection fidelity. The exact threshold can be set by experiment for a given boson sampler PUF token fabrication platform. If it is determined in step 508 that (NO) the measured output quantum photon coincidence frequencies does not match the calculated output quantum photon coincidence probabilities with less than the predetermined level of error, then the response is not verified. Optionally, this step can include the simpler computation verification step of checking that the cumulative probability of returned results is above a specified threshold to alleviate computational burden.

On the other hand, if it is determined in step 508 that (YES) the measured output quantum photon coincidence frequencies match the calculated output quantum photon coincidence probabilities with less than the predetermined level of error, then in step 510 a determination is made as to whether the response was received in less than a predetermined required response time. As provided above, while it is technically possible for a blind attacker to determine most probable output, this would require them to search for all possible output photon combinations which is not possible within the allotted response time. The imposed response time merely permits one to receive the input photon configuration and respond with the measured output—i.e., the output cannot be calculated within the allotted response time. Specifically, since the response can be calculated for verification, the experimental data must be distinguished from a computational attack by the time elapsed in the challenge/response protocol. This can be ensured by the #P-complete theoretical bound for the minimum computational effort for predicting the measurement results. The verification algorithm therefore has a maximum response latency, otherwise the response is not verified.

Namely, if it is determined in step 510 that (NO) the response was not received in less than the required response time, then the response is not verified. On the other hand, if it is determined in step 510 that (YES) the response was received in less than the required response time, then the response is verified. Thus, in order for a response from a remote authority to be verified, the measured output photon coincidence frequencies must match the calculated photon coincidence probabilities, and the response must be received within a certain pre-set period of time. It is notable that the steps and sequence that the steps are performed in methodology 500 are merely one exemplary illustration of the present techniques. For instance, it may in fact be feasible to first rule out responses that were not received within a timely manner in order to avoid the computation involved with determining the photon coincidence probabilities. In that case, step 510 would be performed before step 508.

Methodology 500 looks at the present verification process from the client side. Methodology 600 of FIG. 6 provides a perspective of the process from the remote authority. Namely, in step 602 a particular input photon configuration (i.e., a particular combination of photons) is received by the remote authority (e.g., from a client).

In step 604, the remote authority will run the input photon configuration through its physical optical transmission network, and in step 606 the output quantum photon coincidence frequencies from the physical optical transmission network are measured.

In step 608, the remote authority sends a response to the client including the measured output quantum photon coincidence frequencies. According to an exemplary embodiment, the remote authority calculates the n-most frequent output photon coincidences and their frequency and reports that to the client within its response. As provided above, only responses which provide the correct output quantum photon coincidence frequencies within a set response time will be verified by the client.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Turning now to FIG. 7, a block diagram is shown of an apparatus 700 for implementing one or more of the methodologies presented herein. By way of example only, apparatus 700 can be configured to perform methodology 500 of FIG. 5 and/or methodology 600 of FIG. 6.

Apparatus 700 includes a computer system 710 and removable media 750. Computer system 710 includes a processor device 720, a network interface 725, a memory 730, a media interface 735 and an optional display 740. Network interface 725 allows computer system 710 to connect to a network, while media interface 735 allows computer system 710 to interact with media, such as a hard drive or removable media 750.

Processor device 720 can be configured to implement the methods, steps, and functions disclosed herein. The memory 730 could be distributed or local and the processor device 720 could be distributed or singular. The memory 730 could be implemented as an electrical, magnetic or optical memory, or any combination of these or other types of storage devices. Moreover, the term "memory" should be construed broadly enough to encompass any information able to be read from, or written to, an address in the addressable space accessed by processor device 720. With this definition, information on a network, accessible through network interface 725, is still within memory 730 because the processor device 720 can retrieve the information from the network. It should be noted that each distributed processor that makes up processor device 720 generally contains its own addressable memory space. It should also be noted that some or all of computer system 710 can be incorporated into an application-specific or general-use integrated circuit.

Optional display 740 is any type of display suitable for interacting with a human user of apparatus 700. Generally, display 740 is a computer monitor or other similar display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for remote authentication, comprising the steps of:
   providing an input photon configuration for an optical transmission network from a client to a remote authority, wherein the optical transmission network is part of a verification system which comprises a photon source, one or more input switches on an input side of the optical transmission network wherein the input switches are configured to provide the input photon configuration to the optical transmission network, and an array of photo-detectors on an output side of the optical transmission network wherein the array of photo-detectors is capable of resolving single photons and wherein the array of photo-detectors is configured to measure output quantum photon coincidence frequencies from the optical transmission network;
   receiving a response by the client from the remote authority, the response comprising measured output quantum photon coincidence frequencies from the optical transmission network based on the input photon configuration;
   comparing the measured output quantum photon coincidence frequencies to output quantum photon coincidence probabilities calculated for the optical transmission network; and
   verifying the response if the measured output quantum photon coincidence frequencies matches the output quantum photon coincidence probabilities calculated for the optical transmission network with less than a predetermined level of error which indicates that the remote authority is in physical possession of the optical transmission network, otherwise un-verifying the response,
   wherein the verifying further comprises determining whether the response is received from the remote authority within a predetermined response time, wherein the predetermined response time is equivalent to an amount of time needed i) for the optical transmission network to measure the output quantum photon coincidence frequencies based on the input photon configuration and ii) to transmit the response comprising the measured output quantum photon coincidence frequencies from the remote authority to the client.

2. The method of claim 1, wherein the response further comprises an n-most frequent output photon coincidences.

3. The method of claim 1, further comprising the step of:
calculating the output quantum photon coincidence probabilities for the optical transmission network utilizing public classical optical transmission properties of the optical transmission network.

4. The method of claim 1, wherein the photon source comprises an 8 photon source.

5. The method of claim 1, wherein the photon source is a laser.

6. The method of claim 1, wherein the photon source is a quantum dot device.

7. The method of claim 1, wherein the optical transmission network comprises a boson sampler.

8. The method of claim 1, further comprising the step of:
verifying the response only if the response is received within the predetermined response time, otherwise un-verifying the response.

9. A computer program product for remote authentication, the computer program product comprising a computer readable storage medium having program instructions embodied therewith, the program instructions when executed by a computer to cause the computer to:
provide an input photon configuration for an optical transmission network from a client to a remote authority, wherein the optical transmission network is part of a verification system which comprises a photon source, one or more input switches on an input side of the optical transmission network wherein the input switches are configured to provide the input photon configuration to the optical transmission network, and an array of photo-detectors on an output side of the optical transmission network wherein the array of photo-detectors is capable of resolving single photons and wherein the array of photo-detectors is configured to measure output quantum photon coincidence frequencies from the optical transmission network;
receive a response by the client from the remote authority, the response comprising measured output quantum photon coincidence frequencies from the physical optical transmission network based on the input photon configuration;
compare the measured output quantum photon coincidence frequencies to output quantum photon coincidence probabilities calculated for the optical transmission network; and
verify the response if the measured output quantum photon coincidence frequencies matches the output quantum photon coincidence probabilities calculated for the optical transmission network with less than a predetermined level of error which indicates that the remote authority is in physical possession of the optical transmission network, otherwise un-verify the response,
wherein, when verifying the response, the program instructions further cause the computer to determine whether the response is received from the remote authority within a predetermined response time, wherein the predetermined response time is equivalent to an amount of time needed i) for the optical transmission network to measure the output quantum photon coincidence frequencies based on the input photon configuration and ii) to transmit the response comprising the measured output quantum photon coincidence frequencies from the remote authority to the client.

10. The computer program product of claim 9, wherein the program instructions further cause the computer to:
calculate the output quantum photon coincidence probabilities for the optical transmission network utilizing public classical optical transmission properties of the optical transmission network.

11. The computer program product of claim 9, wherein the program instructions further cause the computer to:
verify the response only if the response is received within the predetermined response time, otherwise un-verify the response.

12. A verification system, comprising:
a photon source;
an optical transmission network;
one or more input switches on an input side of the optical transmission network, wherein the input switches are configured to provide an input photon configuration to the optical transmission network;
an array of photo-detectors on an output side of the optical transmission network, wherein the array of photo-detectors is capable of resolving single photons, and wherein the array of photo-detectors is configured to measure output quantum photon coincidence frequencies from the optical transmission network; and
a statistics engine and response output module on an output side of the array of photo-detectors, wherein the statistics engine and response output module is configured to measure output quantum photon coincidence frequencies from the optical transmission network based on a given input photon configuration received from a client, and send a response to the client within a predetermined response time the response comprising measured output quantum photon coincidence frequencies from the optical transmission network based on the given input photon configuration, and wherein the predetermined response time is equivalent to an amount of time needed i) for the statistics engine and response output module to measure the output quantum photon coincidence frequencies based on the given input photon configuration and ii) to transmit the response comprising the measured output quantum photon coincidence frequencies to the client.

13. The verification system of claim 12, wherein the optical transmission network comprises a boson sampler.

* * * * *